(12) United States Patent
Miyagawa et al.

(10) Patent No.: US 7,002,890 B2
(45) Date of Patent: Feb. 21, 2006

(54) HIGH DENSITY ANALOG RECORDING USING WRITE SYMBOLS HAVING DISTINGUISHABLE READOUT WAVEFORMS

(75) Inventors: Naoyasu Miyagawa, Osaka (JP); Masud Mansuripur, Tucson, AZ (US)

(73) Assignee: LSI Logic Corporation, Milpitas, CA (US)

( * ) Notice: Subject to any disclaimer, the term of this patent is extended or adjusted under 35 U.S.C. 154(b) by 310 days.

(21) Appl. No.: 09/823,852

(22) Filed: Mar. 29, 2001

(65) Prior Publication Data

US 2001/0038583 A1    Nov. 8, 2001

Related U.S. Application Data

(60) Provisional application No. 60/193,059, filed on Mar. 29, 2000, provisional application No. 60/244,819, filed on Oct. 31, 2000.

(51) Int. Cl.
*G11B 7/00* (2006.01)
(52) U.S. Cl. ............................. 369/59.24; 369/47.17
(58) Field of Classification Search ............ 369/47.17, 369/53.33, 59.23, 59.24
See application file for complete search history.

(56) References Cited

U.S. PATENT DOCUMENTS

| | | | | |
|---|---|---|---|---|
| 4,703,469 A | * | 10/1987 | Pettigrew et al. | 369/275.3 |
| 5,121,260 A | | 6/1992 | Asakawa et al. | 36/31 |
| 5,126,990 A | | 6/1992 | Efron et al. | 369/58 |
| 5,537,381 A | * | 7/1996 | Fuji | 369/13.27 |
| 5,576,906 A | * | 11/1996 | Fisher et al. | 360/77.08 |
| 5,675,569 A | * | 10/1997 | Yamaguchi et al. | 369/59.16 |
| 5,790,715 A | * | 8/1998 | Iizuka | 382/309 |
| 5,802,112 A | * | 9/1998 | Ganter | 375/260 |
| 5,978,333 A | * | 11/1999 | Kobayashi et al. | 369/44.41 |
| 5,995,305 A | * | 11/1999 | McNeil et al. | 360/31 |
| 6,078,451 A | * | 6/2000 | Ioki | 360/51 |
| 6,195,215 B1 | * | 2/2001 | Yanagimoto et al. | 360/25 |
| 6,201,839 B1 | * | 3/2001 | Kavcic et al. | 375/341 |

OTHER PUBLICATIONS

G. Bouwhuis et al, Principles of Optical Disc Systems, Adam Hilger Bristol (1985) pg. 237-238, no month no day.
S. Kobayashi et al, High Density Optical Disk Recording by Pit Edge Modulation, Tech. Dig. Of Optical Data Storage Conference, pg. 130 (1994), no month no day.
M. Arai, et al, Multi-level Partial Response recording in MO, Tech. Dig. Of Joint MORIS/ISOM, p. 32 (1997), no month no day.
S. Spielman et al, "Using pit-depth modulation to increase capcaity and data transfer rate in optical discs", Proc. SPIE, vol. 3109, pp. 98 (1997), no month no day.

(Continued)

*Primary Examiner*—Gautam R. Patel
(74) *Attorney, Agent, or Firm*—Christopher P. Maiorana PC

(57) ABSTRACT

A method of recording data on a recording medium includes mapping the data to a set of write symbols wherein each write symbol represents more than one bit of the data. The set of write symbols is defined by defining a set of variable write parameters; generating a plurality of candidate write symbols that specify different values for the variable write parameters; generating a plurality of readout waveforms produced by the plurality of candidate write symbols; analyzing the readout waveforms to determine desired set of readout waveforms; and selecting selected ones of the plurality of candidate write symbols that correspond to the desired readout waveforms to be included in the set of write symbols. The data is written to the medium using the write symbols.

30 Claims, 12 Drawing Sheets

OTHER PUBLICATIONS

T. Ohta et al, "Overview and the Future of Phase-Change Optical Disk Technology", Jpn. J. Appl. Phys. vol. 39, p. 770 (2000), no month no day.

O'Neill, M., et al., "Multi-level Data Storage System using Phase-change Optical Discs", Tech. Dig. Of Optical Data Storage Conference p. 170 (2000), no month no day.

S. Kobayashi et al, GBR (Groove Baseband Recording) for an optical disc ROM, Tech. Dig. Of Optical Data Storage Conference p. 170 (2000), no date.

Mansuripur, M., et al, "Versatile Polychromatic Dynamic Testbed for Optical Disks", Applied Optics, vol. 36, No. 35, p. 9296 (1997), no date.

Mansuripur, M., et al. Real-time studies of mark formation processes in phase-change and magneto-optical media using a two-laser tester J. Magn. Soc. Japan, vol. 25, No. 3-2, pg. 399-407 (2001), no date.

* cited by examiner

HIGH DENSITY ANALOG RECORDING USING WRITE SYMBOLS HAVING DISTINGUISHABLE READOUT WAVEFORMS

CROSS REFERENCE TO RELATED APPLICATIONS

This application claims priority to U.S. Provisional Patent Application No. 60/193,059, entitled HIGH DENSITY STORAGE BY SEGMENTED ANALOG RECORDING ON PHASE CHANGE DISK filed Mar. 29, 2000 which is incorporated herein by reference for all purposes and U. S. Provisional Patent Application No. 60/244,819, entitled ANALOG RECORDING ON PHASE-CHANGE OPTICAL DISKS filed Oct. 31, 2000 which is incorporated herein by reference for all purposes.

This invention was made with United States Government support by the U.S. Department of Commerce through the NSIC/MORE program under cooperative agreement number 70NANB7H3054. The United States Government has certain rights in this invention.

FIELD OF THE INVENTION

The present invention relates generally to optical data storage. More specifically, high density analog recording is disclosed.

BACKGROUND OF THE INVENTION

Perhaps the most significant breakthrough in the field of optical data storage technology has been the shift from analog to digital recording. Many benefits such as error correction and data compression result from the introduction of digital schemes. It must be recognized, however, that by introducing the techniques of digital recording, delicate features in the recorded patterns of information on the media have been lost. To eliminate the gap between digital and analog schemes and to increase recording capacity, various multi-level recording methods have been investigated.

The tradition in digital storage is to try to record "perfect marks" on the storage medium (disk, tape, etc.). An ideal mark is one that is fully saturated in one or the other state (e.g., amorphous or crystalline), fills the width of the track uniformly, has smooth boundaries, and has the correct length and center position. Writing ideal (or near-ideal) marks entails substantial efforts on the part of the drive/media designer. As higher recording density is required, obtaining ideal or nearly ideal recording marks becomes more difficult. What is needed is an alternative approach to optical recording that will enable higher recording densities to be achieved.

SUMMARY OF THE INVENTION

Accordingly, a recording system combining analog recording with digital processing schemes that preserves the main advantages of digital encoding and offers the potential of increased storage density is disclosed. In one embodiment, a segmented analog recording method divides the media into data blocks with intervening guard bands. A write pulse is selected for each data block that will result in a readout waveform that is distinguishable from other potential readout waveforms. In one embodiment, an analog partial response method is used to write waveforms that produce desired readout waveforms.

In one embodiment, it is determined which waveforms the read channel can and should supply given its particular constraints (e.g., spectral content, bandwidth, noise characteristics, restrictions of the peak amplitude, etc.). Once the desired read waveforms have been identified, strategies are developed for recording "patterns" (e.g., amorphous/crystalline regions on phase-change media, magnetic domains on MO media) that can produce the desired waveforms during readout. In one embodiment, a genetic algorithm is used to develop appropriate recording strategies. By employing the heretofore forbidden mark/space patterns at the medium, the proposed analog schemes are capable of delivering higher recording densities. Also, by allowing the system designer to match the read waveforms to channel characteristics, the proposed schemes use the available SNR more efficiently.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, a method of determining a write strategy for recording data on a medium includes defining a set of variable write parameters; generating a plurality of candidate write symbols that specify different values for the variable write parameters; generating a plurality of readout waveforms produced by the plurality of candidate write symbols; analyzing the readout waveforms produced by the marks to determine a set of distinguishable readout waveforms; and selecting selected ones of the plurality of candidate write symbols that correspond to the distinguishable readout waveforms to be included in a set of write symbols that are suitable for mapping to data for the purpose or writing data to the medium.

In one embodiment, a recording medium has data blocks written on it wherein the data blocks are written using a set of write symbols determined by defining a set of variable write parameters; generating a plurality of candidate write symbols that specify different values for the variable write parameters; generating a plurality of readout waveforms produced by the plurality of candidate write symbols; analyzing the readout waveforms produced by the marks to determine a set of distinguishable readout waveforms; and selecting selected ones of the plurality of candidate write symbols that correspond to the distinguishable readout waveforms to be included in a set of write symbols that are suitable for mapping to data for the purpose or writing data to the medium.

In one embodiment, a method of recording data on a recording medium includes mapping the data to a set of write symbols wherein each write symbol represents more than one bit of the data and wherein the set of write symbols is defined by defining a set of variable write parameters; generating a plurality of candidate write symbols that specify different values for the variable write parameters; generating a plurality of readout waveforms produced by the plurality of candidate write symbols; analyzing the readout waveforms to determine a set of distinguishable readout waveforms; and selecting selected ones of the plurality of candidate write symbols that correspond to the distinguishable readout waveforms to be included in the set of write symbols; and writing the data to the medium using the write symbols.

In one embodiment, a method of determining a write strategy for writing data to and reading data from a read/write channel includes defining a set of variable write parameters; generating a plurality of candidate write symbols that specify different values for the variable write parameters; generating a plurality of readout waveforms produced by the plurality of candidate write symbols; analyzing the readout waveforms produced by the marks to determine a set of readout waveforms that match the read/write channel; and selecting selected ones of the plurality of candidate write symbols that correspond to the set of readout waveforms that match the read/write channel to be included in a set of write symbols that are suitable for mapping to data for the purpose or writing data to the medium.

In one embodiment, a recording medium has data written on it wherein the data is written using a set of write symbols determined by: defining a set of variable write parameters; generating a plurality of candidate write symbols that specify different values for the variable write parameters; generating a plurality of readout waveforms produced by the plurality of candidate write symbols; analyzing the readout waveforms produced by the marks to determine a set of readout waveforms that match a read/write channel that includes the recording medium; and selecting selected ones of the plurality of candidate write symbols that correspond to the readout waveforms that match the read/write channel that includes the recording medium to be included in a set of write symbols that are suitable for mapping to data for the purpose or writing data to the medium.

In one embodiment, a method of recording data on a recording medium includes mapping the data to a set of write symbols wherein each write symbol represents more than one bit of the data and wherein the set of write symbols is defined by: defining a set of variable write parameters; generating a plurality of candidate write symbols that specify different values for the variable write parameters; generating a plurality of readout waveforms produced by the plurality of candidate write symbols; analyzing the readout waveforms produced by the marks to determine a set of readout waveforms that match a read/write channel that includes the recording medium; and selecting selected ones of the plurality of candidate write symbols that correspond to the readout waveforms that match the read/write channel that includes the recording medium to be included in the set of write symbols; and writing the data to the medium using the write symbols.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Segmented Recording and Matched-Filter Detection

In one embodiment, a segmented recording method is based on recording one byte at a time. A stream of binary data is divided into 8-bit segments, and each segment is written by a specific write waveform. The number of distinct write patterns is 256, and each pattern realizes one of 256 different readout waveforms. During readout, the waveforms obtained from individual segments are compared with waveforms in a pre-stored table, each element of which corresponds to a single byte of information. Using pattern-matching techniques, the recorded information can be retrieved.

Figure 1:
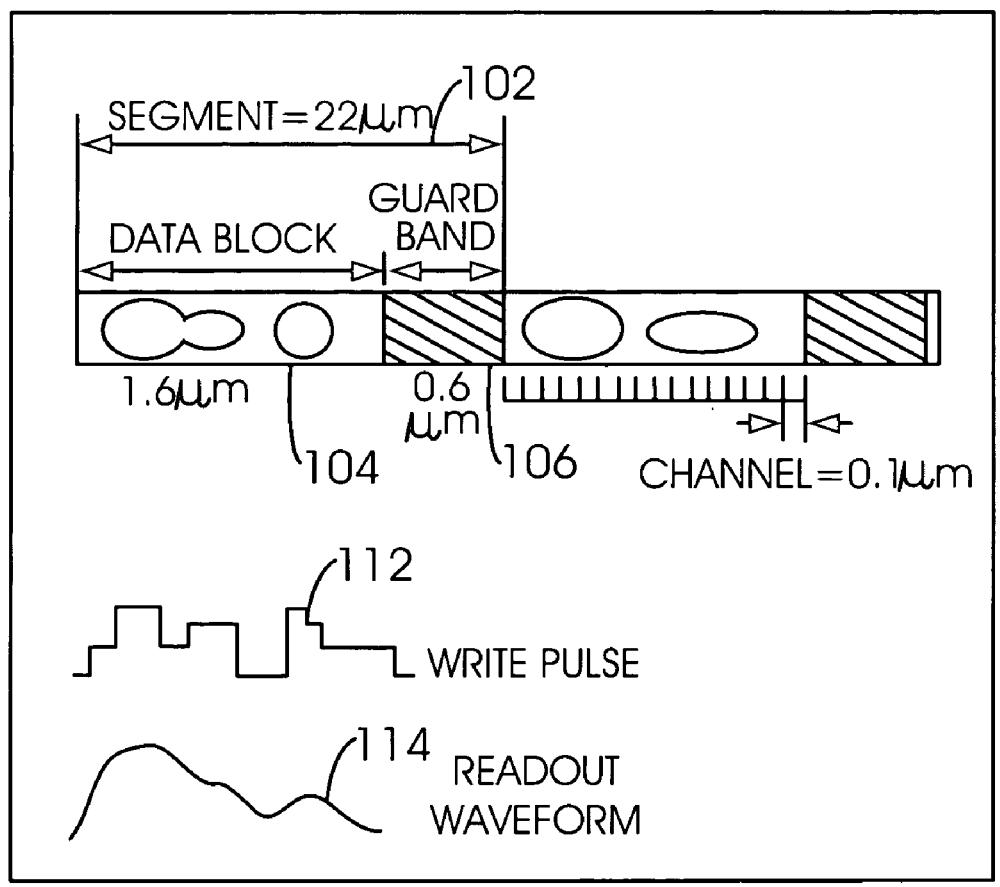
FIG. 1 is a diagram illustrating a segmented analog recording pattern written to a disc.

FIG. 1 is a diagram illustrating a segmented analog recording pattern written to a disc. The length of each segment 102 along the track is divided into two parts. The byte symbol is written in data block 104 while guard band 106 is left undisturbed. The guard band helps avoid inter-symbol interference (ISI) during both readout and recording. By using pattern matching techniques to detect the analog readout waveform, the need for written marks to be oval shape and regular (i.e., ideal marks) is obviated. A possible write pulse 112 for creating the pattern shown in data block 104 is illustrated as well as a resulting readout waveform 114.

In "byte recording" the length of the guard band should be carefully optimized. In one embodiment, the same linear density (without overhead) as DVD-ROM is targeted. With $\lambda$=660 nm and NA=0.6, the total segment length is set to 2.2

µm. The length of the guard band is chosen to avoid ISI during reading and thermal cross-talk during writing. In readout, the guard band should be longer than the optical cutoff period of $\lambda/(2NA)\sim 0.55$ µm. According to thermal simulations, a 0.6 µm guard band is also adequate for suppressing thermal interference.

To obtain distinct patterns of read waveform, various patterns of write pulses can be tested and those patterns which are distinguishable from each other selected. In one embodiment, patterns were tested on a DVD-RAM/2.6 GB commercial disk. These experiments were performed on a dynamic testbed with $\lambda=660$ nm and NA=0.6 at a linear track velocity of 6 m/s. Each segment (corresponding to a byte of information) was divided into 22 channels: 16 channels for the data block and 6 channels for the guard band. The duration of each channel corresponds to 0.1 µm or 17 ns under the above conditions. In one embodiment, 4 of the 16 data block channels were not used during writing to avoid the extension of the recorded marks into the guard band and arbitrary laser power levels were assigned to each of the 12 remaining channels. Three laser power levels produce $3^{12}=531441$ different write patterns to select from while searching for distinct read patterns. Different numbers of laser power levels may be used in different embodiments.

In one embodiment, a strategy of using simple write patterns was employed in searching for distinct patterns. A variety of waveforms were produced in a systematic way by selecting one, two, or three pulses per segment, each pulse having one of 4 power levels. Alternatively, randomly-selected write power waveforms could be chosen to obtain a large number of arbitrary-looking read waveforms. In general, it is possible to avoid complex algorithms for determining the write patterns given that the choice of write pattern for a given read waveform is not unique, and that a certain amount of write power margin is generally necessary to distinguish the resulting waveforms from each other.

Figure 2:
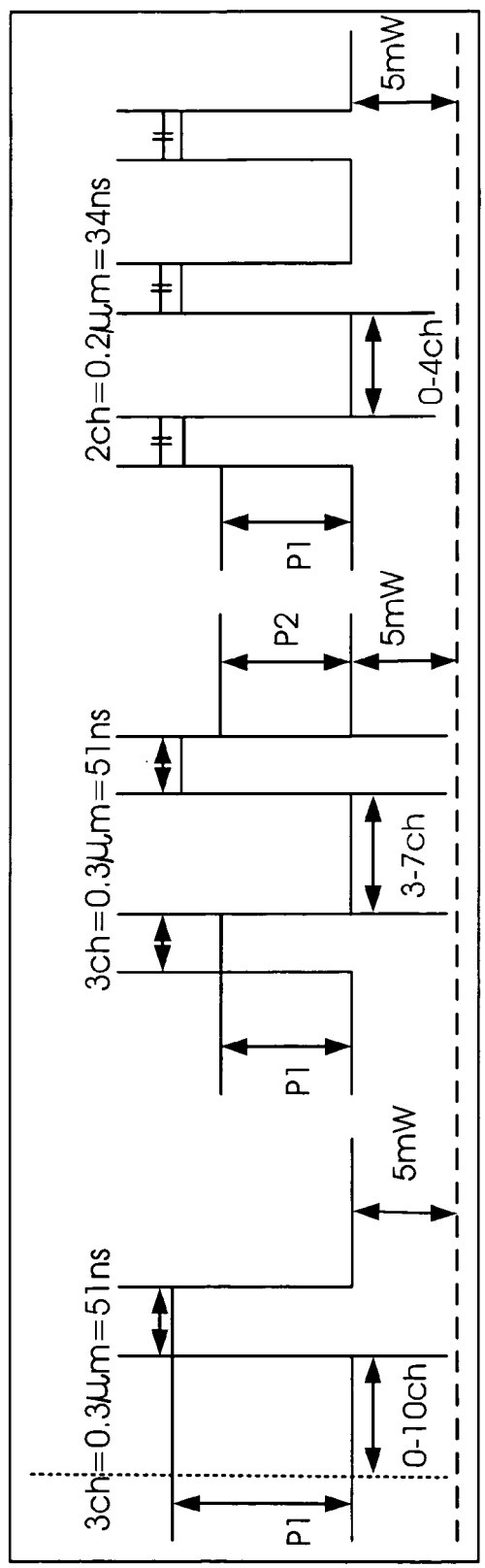
FIG. 2 is a diagram illustrating different write pulses used in one embodiment.

FIG. 2 is a diagram illustrating different write pulses used in one embodiment.

Each pulse is 2 or 3 channel bits long, and the positions of the pulses vary. Such pulses may generally be produced by available lasers and laser power control interfaces. Pulse power levels $P_1$ and $P_2$ were chosen as 9, 10, 12 and 14 mW, respectively, in order to reduce amplitude fluctuations of the read signal.

Numerous write patterns were subsequently used to record amorphous mark patterns of differing shapes. Each read signal was then analyzed to determine its distinguishability from other generated waveforms.

Figure 3:
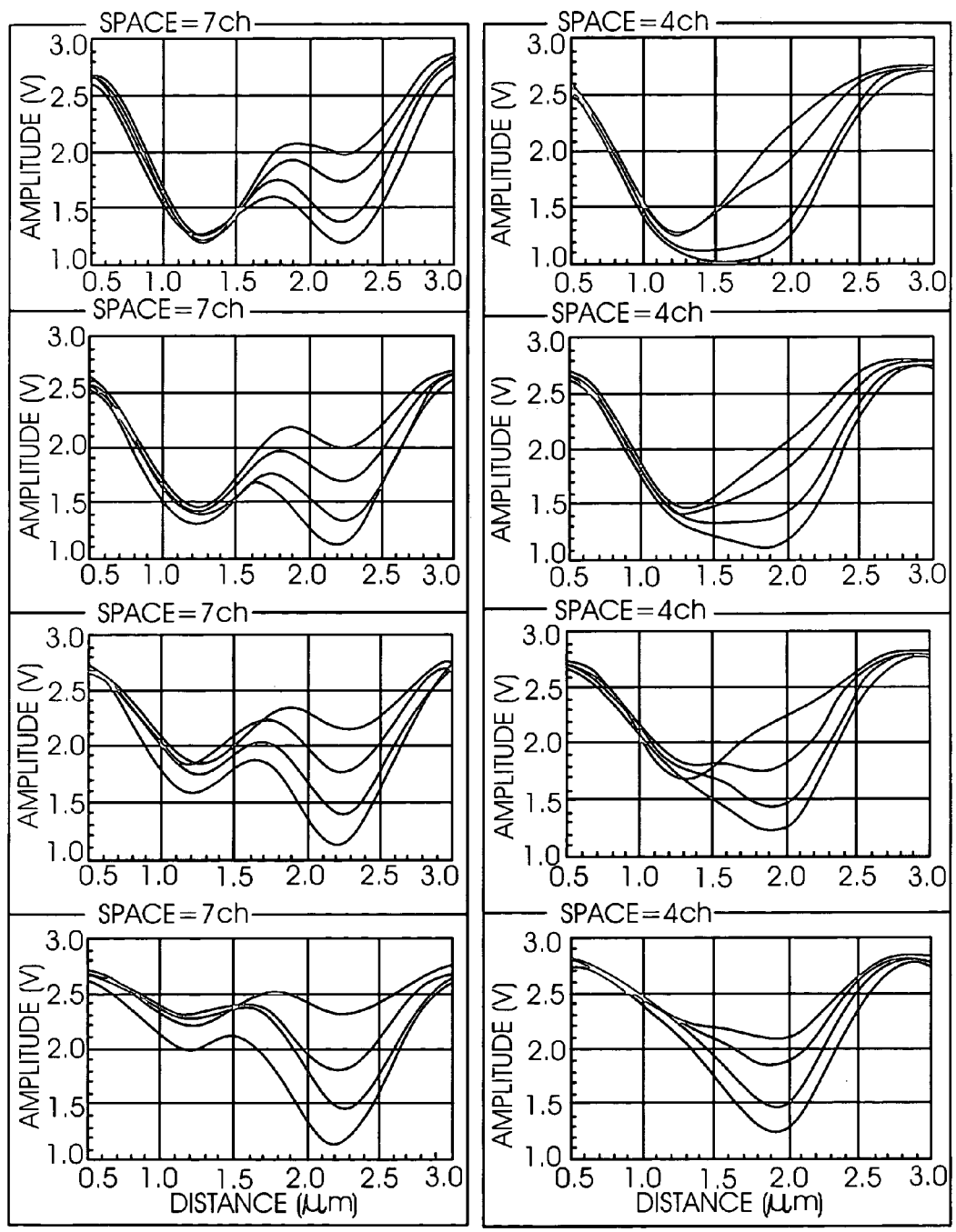
FIG. 3 is a diagram illustrating some of the resulting waveforms selected for inclusion in a pattern table.

FIG. 3 is a diagram illustrating some of the resulting waveforms selected for inclusion in a pattern table. A variety of patterns is seen to emerge. Using one set of distinguishability criteria, the total number of distinguishable waveforms obtained using these simple pulses was 220. A target of 256 waveforms or more, if desired, is attainable if more complex write patterns are used.

Figure 4:
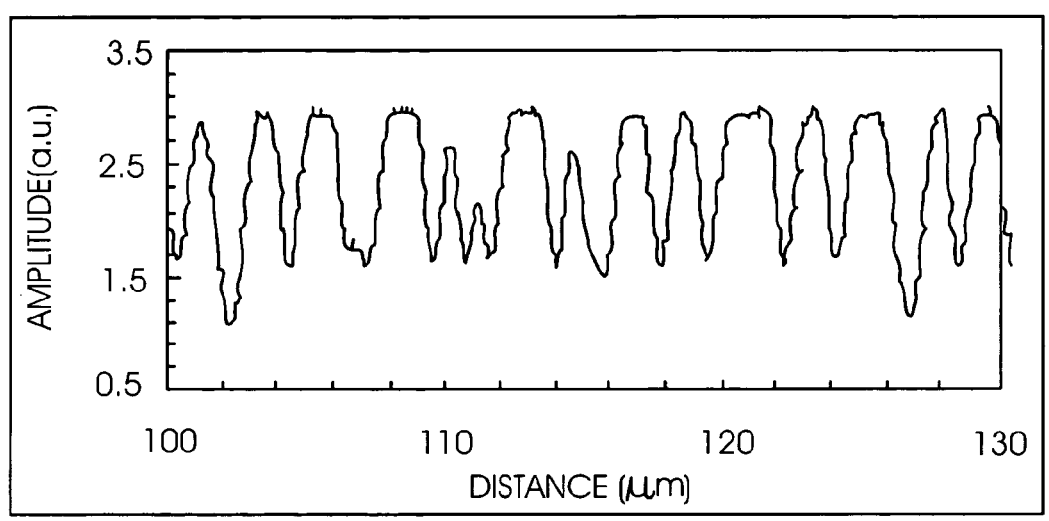
FIG. 4 is a diagram illustrating a sequence of read waveforms obtained by the aforementioned write strategy.

FIG. 4 is a diagram illustrating a sequence of read waveforms obtained by the aforementioned write strategy. It is clear that each segment has been recorded and retrieved distinctly from its adjacent neighbors.

Figure 5:
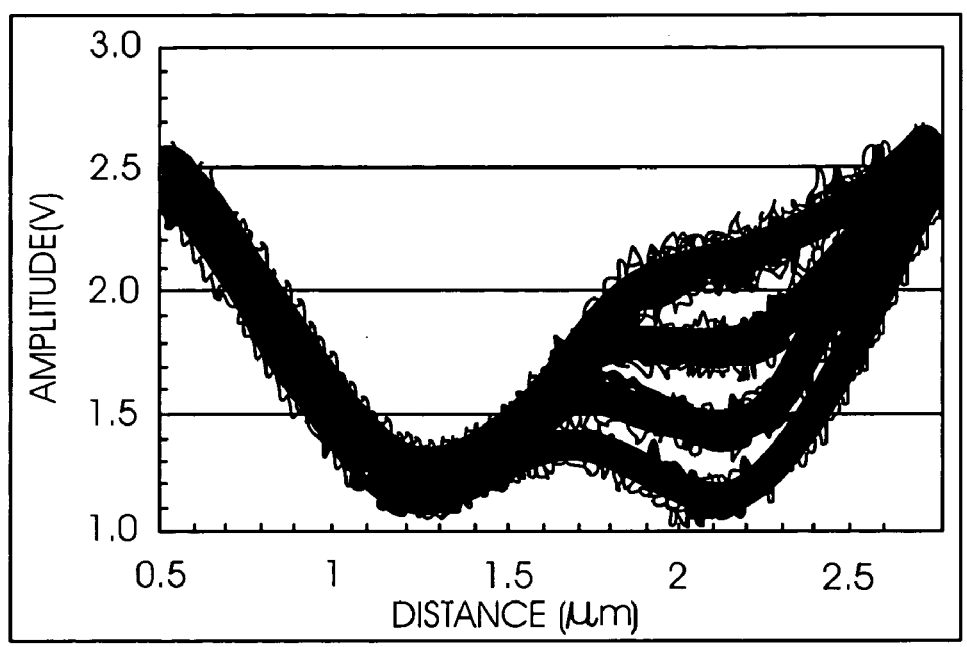
FIG. 5 is a diagram illustrating readout waveforms derived from a typical write pattern using four different power levels.

FIG. 5 is a diagram illustrating readout waveforms derived from a typical write pattern using four different power levels. Each trace contains 100 superimposed signals. The observed amplitude deviations are 3.5~3.7%. The 220 distinguishable patterns obtained above remain distinguishable with this level of variability.

Once the patterns are written and read, the distinct readout waveforms must be detected and distinguished. In one embodiment, a detection method software imports the sampled waveform, normalizes the signal amplitude, arranges for synchronization, and separates the signal into individual segments. The cross-correlation coefficients between each readout segment and the patterns in the look-up table are calculated. Since cross-correlation does not effectively distinguish waveforms with similar shapes but different magnitudes, the DC levels of the readout waveforms are also compared with those of the patterns in the table. When both parameters fall within acceptable ranges, the read pattern is successfully detected.

Figure 6:
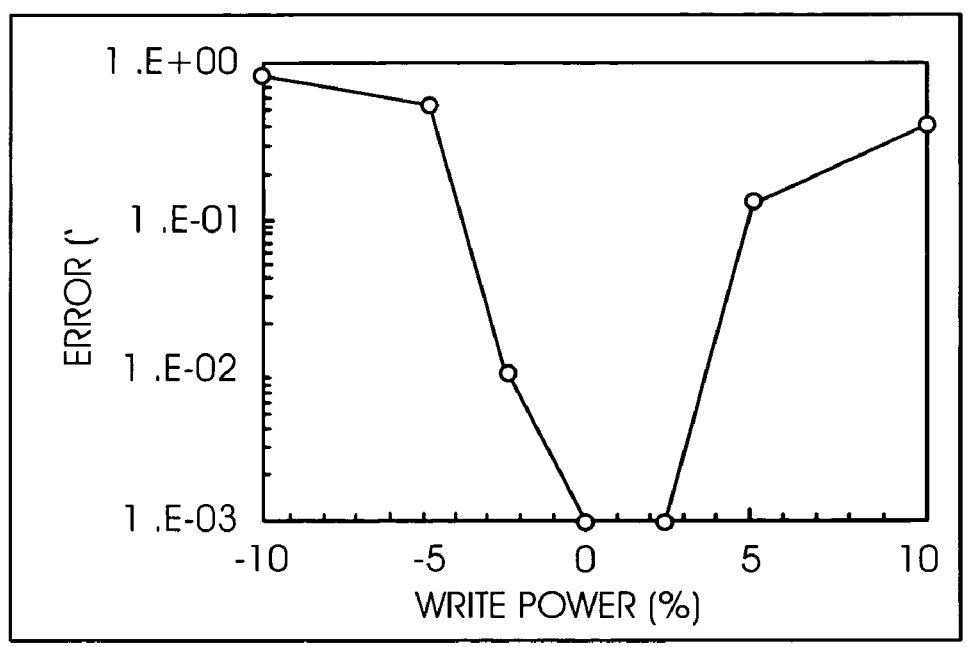
FIG. 6 is a diagram illustrating the dependence of error-rate on write power variations around its nominal value in one embodiment.

FIG. 6 is a diagram illustrating the dependence of error-rate on write power variations around its nominal value in one embodiment. Although the error rate was below $10^{-3}$ at the optimum power level, it increased dramatically when the write power decreased by more than 5%. This result is reasonable considering that (i) the waveforms in our table were chosen to have ±10% margin in amplitude against other waveforms and (ii) a 5% reduction of power causes a 10% amplitude reduction for small marks. Precise laser power control is therefore important. Preferably, the allowable amplitude fluctuation is less than 6% and the tolerance of write power variation is 2–3%.

To improve the margin of error, the distance between adjacent waveforms may be increased. However, increasing the distance between adjacent waveforms reduces the number of possible readout signals, which results in a lower storage density.

A segmented analog recording method has been described. Relatively simple write pulses with limited (4 level) power variation produces at least 220 distinguishable readout waveforms. In different embodiments either more or fewer readout waveforms may be produced by providing more or less complex allowed write pulses and allowed power variations. The required guard band for each segment, however, limits storage efficiency. Also it would be desirable to develop a scheme that would implement a more simple signal detection scheme than the described matched filter. Accordingly, an alternative analog recording method using aspects of the PRML signaling scheme has also been developed.

Analog Partial Response Method

To implement analog partial response recording, the first step is to identify ideal read waveforms that match the channel characteristics as closely as possible. Because such waveforms are expected to emerge directly from the photodetector(s), they require no further (electronic) equalization, thus eliminating the additional noise introduced by equalization in conventional systems. The spectrum of the ideal readout waveforms can be made to follow the channel's SNR spectrum. This allows a closer approach to the information-theoretic capacity of the media than is possible in conventional systems, where the read waveform is a by-product of a writing strategy that is largely ignorant of the read channel characteristics.

Figure 7A:
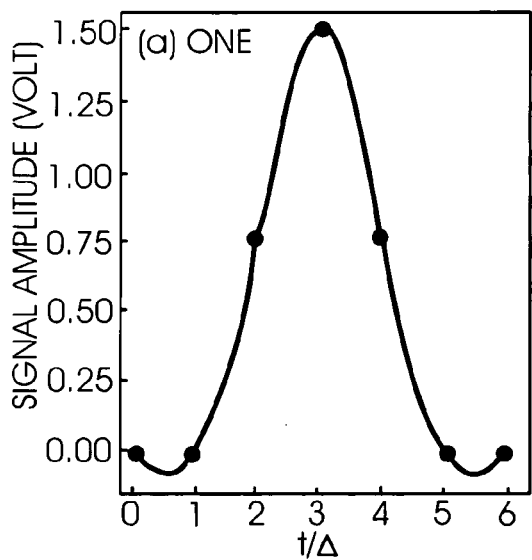
FIGS. 7A and 7B are diagrams illustrating a pair of waveforms selected to represent the individual channel bits in one embodiment.
Figure 7B:
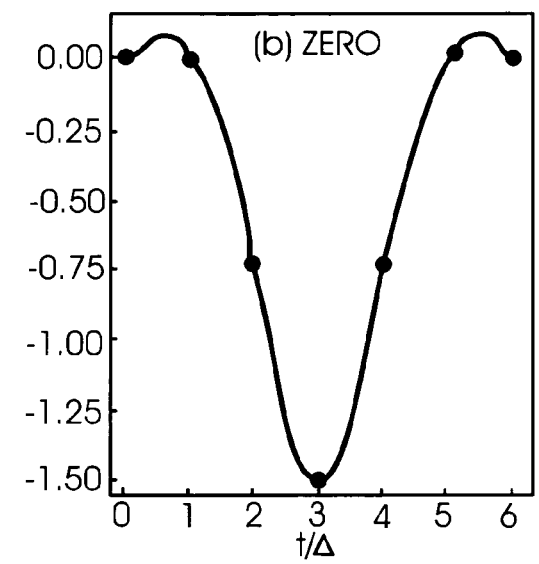

A pair of waveforms are selected for the individual channel bits 1 and 0. FIGS. 7A and 7B are diagrams illustrating a pair of waveforms selected to represent the individual channel bits in one embodiment. The 0 waveform is an inverted version of the 1 waveform. Preferably, the pair of waveforms match the channel characteristics as closely as possible. Typically each waveform is zero at all multiples of the clock period Δ, except at a finite number of points, where each has a set of well defined non-zero values. For the waveforms illustrated in FIG. 7, the non-zero values of the chosen functions are ±0.75 and ±1.5 volts, occurring at $t=2\Delta$, $3\Delta$ and $4\Delta$.

Since the illustrated 1 and 0 waveforms are similar to the equalized output of a PRML channel, Viterbi's algorithm can be used to extract the stored bit-sequences from the readout waveforms.

The clock period $\Delta$ is chosen based on the wavelength $\lambda$ of the laser, the numerical aperture NA of the objective, and the linear velocity V of the disk. For the waveforms illustrated in FIGS. 7A and 7B, the width of the individual One/Zero waveforms, ~4$\Delta$, should be roughly equal to $\lambda/(NA.V)$. In a DVD-RAM system where $\lambda=650$ nm, NA=0.6, and V=6 m/s, a reasonable choice for the clock period is $\Delta=45$ ns. In other embodiments, the clock period may be reduced.

Figure 7C:
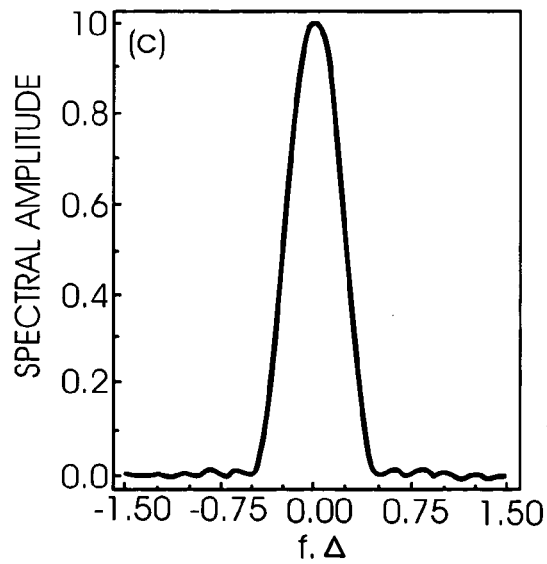
FIG. 7C shows a linear scale and FIG. 7D shows a logarithmic scale (decibels).
Figure 7D:
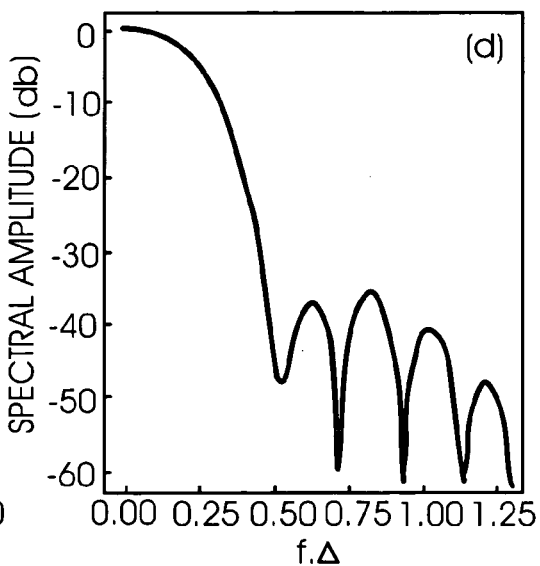
Figure 8:
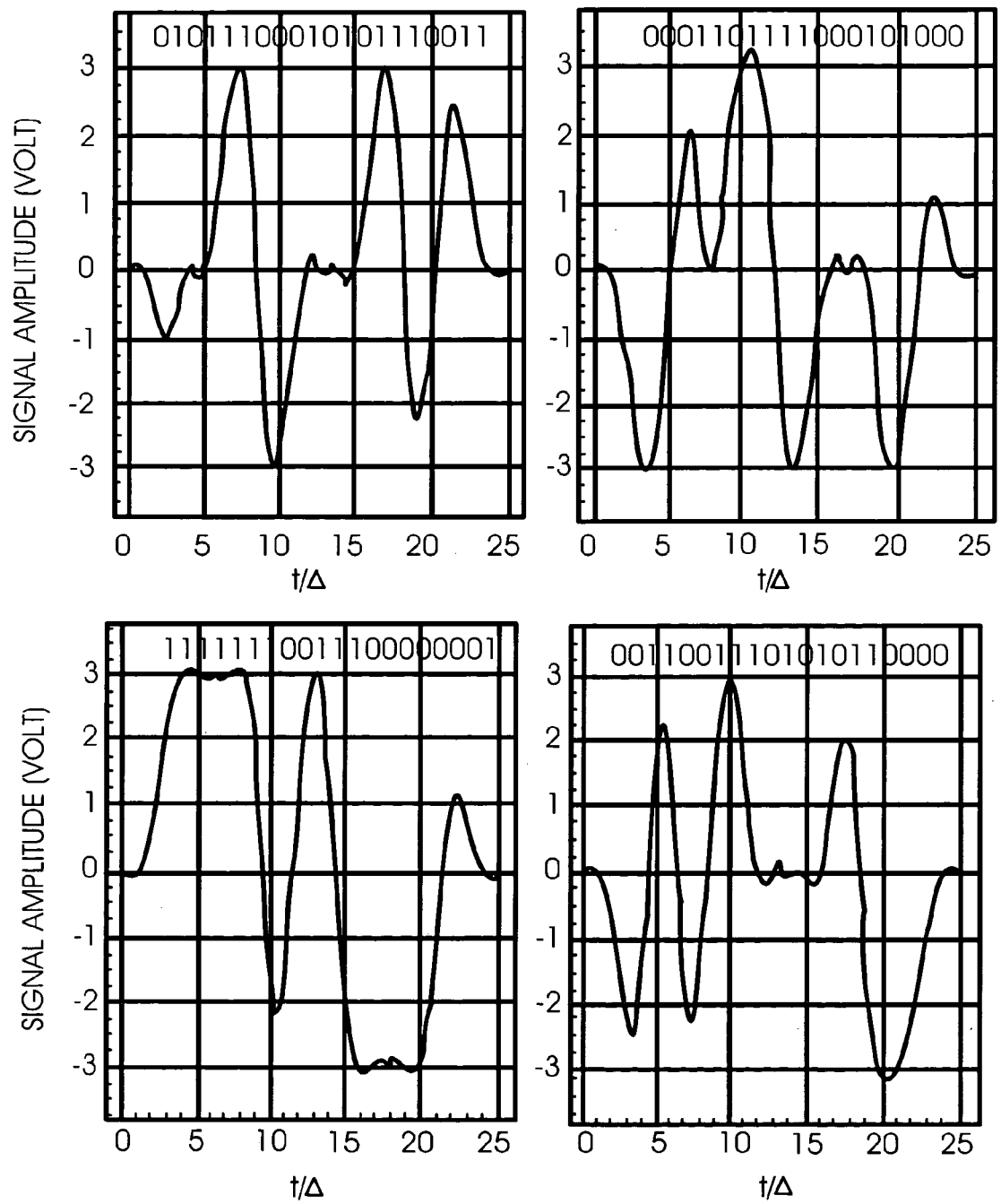
FIGS. 8A–8D are diagrams illustrating a few such waveforms for N=20.

The One and Zero waveforms of FIGS. 7A and 7B have identical spectra (because they differ only by a sign factor). FIGS. 7C and 7D are diagrams illustrating the normalized amplitude of the Fourier transform of these functions. FIG. 7C shows a linear scale and FIG. 7D shows a logarithmic scale (decibels). The cutoff is seen to occur at $f\Delta \approx 0.5$, corresponding to $f_c=2NAV/\lambda$, which is the well-known cutoff frequency of optical storage systems. Above the cutoff, the spectral strength of the waveform is less than −36 dB, which is typically below the noise level and, therefore, acceptable.

During readout, the spectrum of a random bit-sequence will be the same as the Fourier transform of the One/Zero waveform, shown in FIG. 7D. Therefore, in the initial design phase, it is preferred that the One/Zero functions are adjusted until their (common) spectrum becomes band-limited and closely resembles the channel's spectrum of signal-to-noise ratio, SNR(f). In other words, the spectral strength of the read waveforms should be greatest where the channel has the largest SNR, weakest where SNR is small, and negligible beyond the cutoff frequency $f_c$.

Once the One/Zero waveforms have been selected, a block-length N is chosen for the sequence of channel-bits to be recorded as a single block on the storage medium. For instance, if N=20, one out of $2^{20}=1,048,576$ patterns will be written to the disk, each expected to yield an individual 20-bit-block waveform upon readout. The next step involves forming all $2^N$ possible waveforms that one expects to obtain upon reading an N-bit-block. This is done by shifting along the horizontal axis the One/Zero waveforms in multiples of the clock period $\Delta$, then adding the shifted functions in accordance with the particular N-bit sequence under consideration. For the One/Zero waveforms of FIGS. 7A and 7B, which are 6$\Delta$—long, the total length of the N-bit waveform will be (N+5) $\Delta$. FIGS. 8A–8D are diagrams illustrating a few such waveforms for N=20.

The next step is to develop a writing strategy that would lead to recorded "patterns" on the disk which, upon readout, would yield these ideal waveforms. This can be accomplished in a number of ways, including randomly searching for write strategies that produce desired waveforms or using expert knowledge of the write process to generate candidate write strategies that are likely to produce desired waveforms. In one embodiment, a genetic algorithm is used to find appropriate sequences of laser pulses that will produce each of the $2^N$ read waveforms.

The sequence of laser pulses are specified by several adjustable parameters. Typically, these parameters include the duration and height of each pulse, the width of a cooling pulse following each heating pulse, and the interval and the laser power level between adjacent pulses. In different embodiments, different adjustable parameters may be used to specify laser pulses. Enough variation in the pulses is provided so that the desired readout waveforms can be produced.

In one embodiment, a genetic algorithm is used to search for appropriate laser pulse sequences. The parameters that define a laser pulse sequence are specified in a table and adjusted. There are $2^N$ rows in the table, each row containing all the parameters needed to record a single pattern on the medium that corresponds to a specific read waveform. The goal of the search procedure is to find optimum values for each set of such parameters. The search procedure includes the following steps:

Step 1: Select one row from the Table and assign a random set of values to the various write parameters. Record the random pulse sequence and the read the recorded pattern. If desired, the readout signals may be averaged over multiple recordings to reduce noise. Compare the ideal (desired) waveform for the selected row with the actual (averaged) signal that is obtained.

Step 2: Introduce small, random variations (mutations) in each of the parameters of the write sequence. Record the sequence is again (as in Step 1) and compare the resulting read signal with the desired waveform. If the agreement between the two Therefore, the length of each waveform is 20 $\Delta$, and the number of the write channel bit corresponding to each waveform is 40. In generating the write pulse sequence, one of these 40 write channel bits is randomly chosen and the power level of the write pulse corresponding to the chosen write channel bit is randomly selected from four predetermined values. The following search process is implemented:

Step 1. The theoretical target waveform is divided into component patterns according to every peak.

Step 2. As an initial write pulse sequence, a set of the unique write pulses is assigned in accordance with the height and width of the peak and valley, respectively, in each component pattern. The unique write pulses are experimentally determined in advance on the basis of expert knowledge.

Step 3. After the first writing was performed, the actual readout waveform is compared with the target waveform.

Step 4. RMS differences by every component pattern is calculated and a search is performed for the component pattern with the largest difference.

Step 5. One write channel bit is randomly chosen from the worst component pattern and its power level is randomly selected from the four predetermined values as a mutation.

Step 6. After writing was performed again, the actual readout waveform is compared with the target waveform.

Step 7. If the difference is reduced, the selected power level of the cannel bit replaces that of the previous write pulse sequence. Otherwise, the previous write pulse sequence is maintained.

Step 8. Repeat steps 5~7 until stabilized.

Step 9. RMS differences by every component pattern are calculated again and the component pattern with the largest difference is searched.

Step 10. Repeat steps 4~9 until stabilized.

Step 11. The peak or middle melting power levels are randomly changed within ±10%, Step 12. Repeat steps 4~11 until stabilized.

In one embodiment, the following alternative search process is used:

Step 1. The theoretical target waveform is divided into peak or valley patterns.

Step 2. To simulate the patterns, a set of unique write pulses is assigned respectively in accordance with the height and width of each peak and valley. The unique write pulses were experimentally determined in advance, on the basis of expert knowledge. This is procedure is further described in connection with FIG. 9.

Step 3. Rules are assigned. i) The first 2 channels are considered associated with the last 2-channel of a previous waveform. ii) Gaps between the assigned pulses are filled by the erase-pluses. iii) Write pulse assigned to the middle level (=) 0 are waveforms improves as a result of a particular mutation, accept that mutation, otherwise reject it (survival of the fittest).

Step 3. Repeat Step 2 until a stable set of parameters is obtained, that is, until further adjustments to the write sequence become ineffectual in improving the read waveform, and all subsequent mutations are rejected. At this point the write sequence should yield a readout signal that is nearly identical to the desired waveform.

Step 4. Repeat the above steps for another row in the Table until all rows are exhausted.

In one embodiment, this process is improved by choosing the initial values of the parameters in accordance with some expert knowledge of the recording process. A purely random strategy may also be used, and such a strategy is expected to converge, albeit somewhat more slowly, under selection pressures to a good writing scheme for each N-bit sequence. Developing the write strategy might require several hours or longer on an automated system, but this procedure need only be performed only once during the development cycle of a given product. When all the adjustable parameters have been fixed at their optimal (or near-optimal) values, the complete lookup table is programmed into a ROM chip and placed in the disk drive.

In one embodiment, a genetic algorithm is somewhat limited to simplify the search procedure. The parameters to be randomly mutated are the power levels of the write pulses. All write pulses are composed of an arbitrary number of the write channel bits. The width of the write channel bit is fixed at $\Delta/2$. The Block size N is 20 varied in accordance with the adjacent patterns. iv) Long spaces make the following pulse 1 $\Delta$ longer.

Step 4. The first writing is performed and the actual readout waveform is compared with the target waveform.

Step 5. If the difference surpassed the predetermined threshold, the position of each write pulse set is randomly shifted by $\pm\Delta$ or $\pm\Delta/2$.

Step 6. Steps 4 and 5 are repeated.

Step 7. If the difference continues to be above the threshold, the laser power of each write pulse set is randomly shifted by 5%.

Step 8. Steps 4 to 7 are repeated.

Step 9. If the threshold is not determined in advance, the pulse sequences and the power that realized the lowest difference is selected from all its combinations.

Figure 9A:
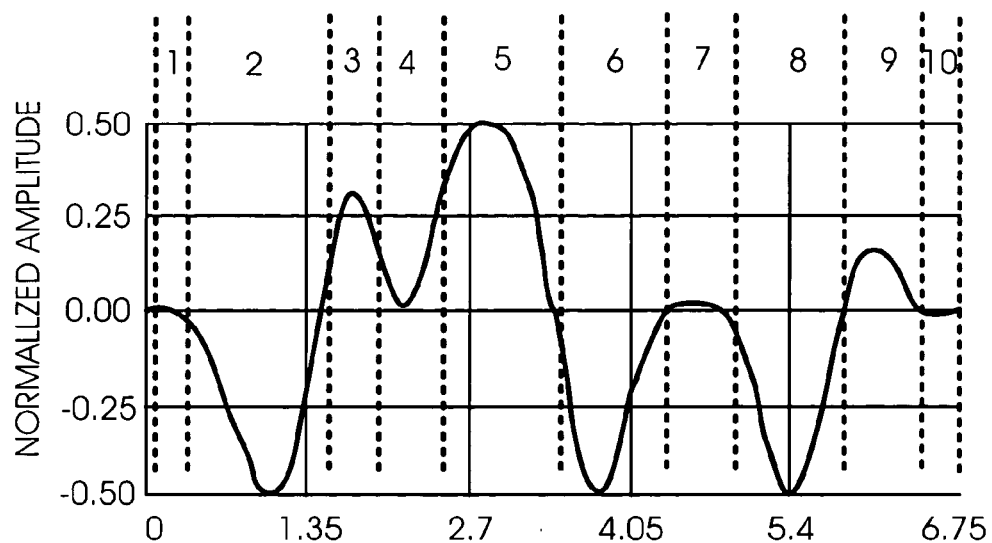
FIGS. 9A–9D are diagrams illustrating a decomposition procedure of a target waveform.
Figure 9B:
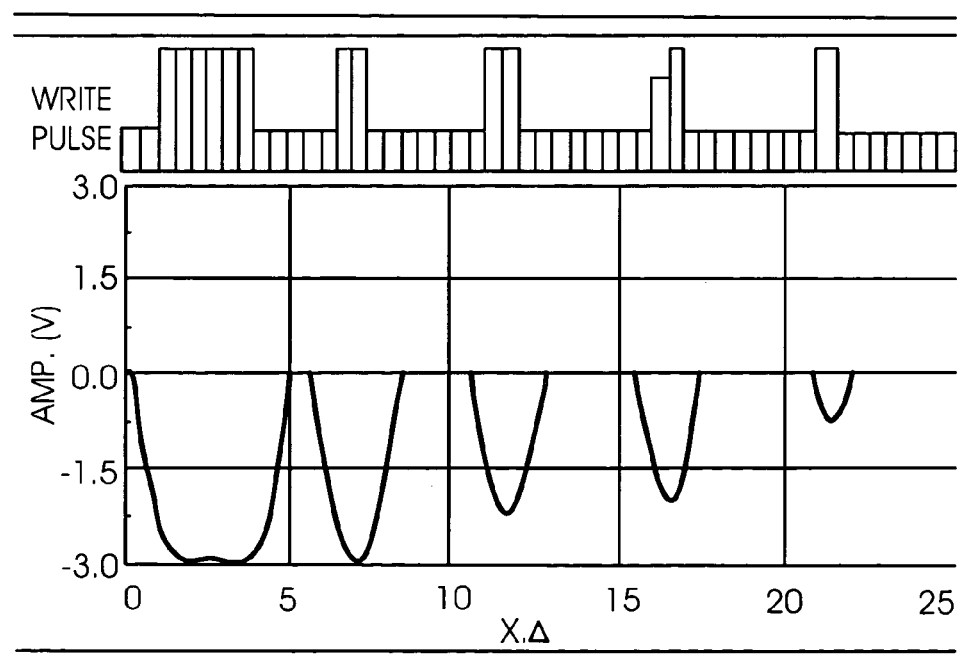
Figure 9C:
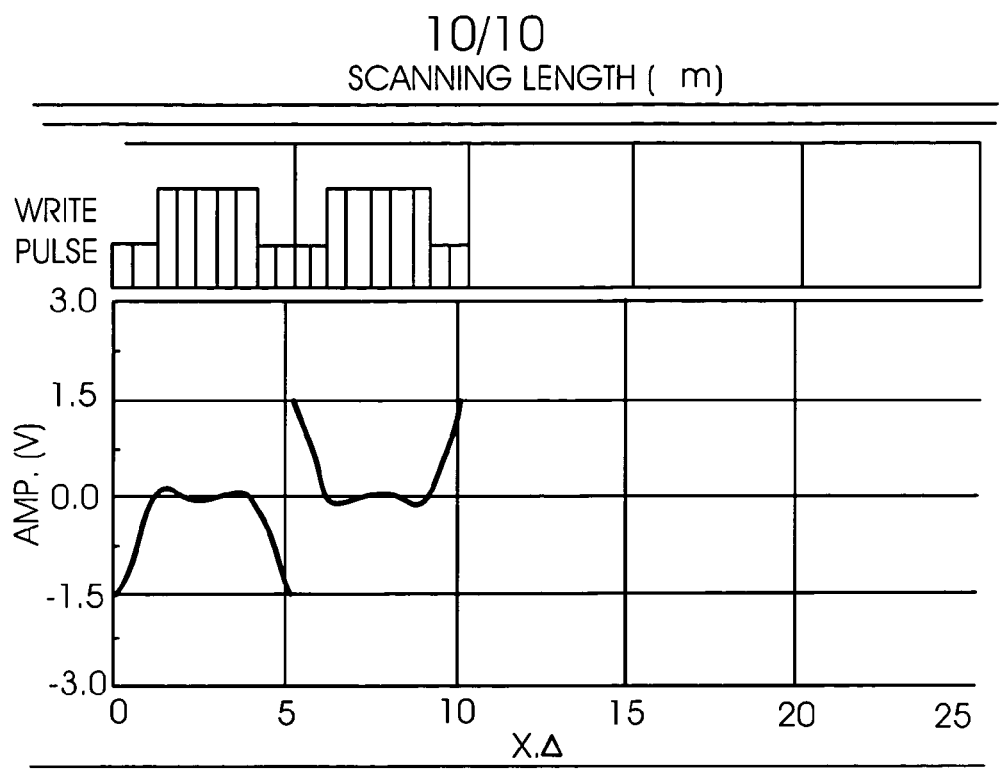
Figure 9D:
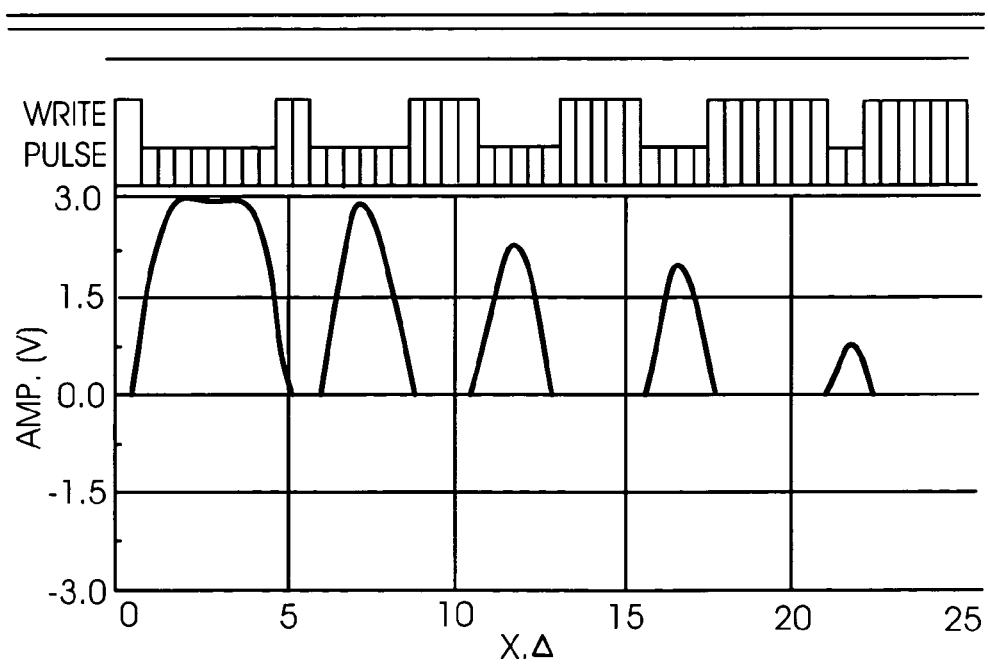

FIGS. 9A–9D are diagrams of illustrating a decomposition procedure of a target waveform. FIG. A is a whole waveform. The waveform is decomposed into 1~10 component waves. FIGS. 9B, 9C and 9D are a classification table of the component waves (bottom) and corresponding write pulse sets having four power levels (top). Hatched bars depict assigned pulses and white bars are neighboring pulses. In one embodiment, the pulses were optimized under the following conditions: $\lambda$=660 nm, NA=0.6, Disk: DVD-R/W. Write/read linear velocity =5.4 m/s, $\Delta$=50 nsec. The peak melting, middle melting, erasing and reading powers levels were 14.7, 11.2, 5.0, and 1.0 mW, respectively.

Other search procedures are used in different embodiments. In general, a search procedure may be optimized according to a specific type of media that is used and variable writing parameters that are available.

Figure 10A:
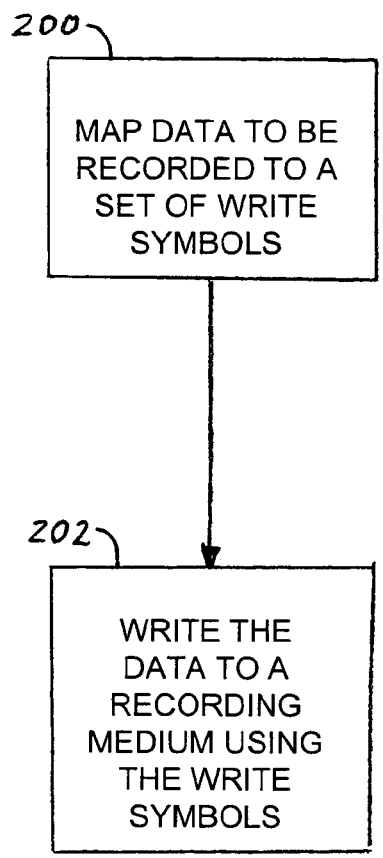
FIGS. 10A–10B are flow diagrams illustrating write and read procedures, respectively.

FIG. 10A is flow diagram illustrating a write procedure. The write procedure for recording data on a recording medium may comprise a step 200 and a step 202. The step 200 may comprise mapping data to be recorded to a set of write symbols. Each of the write symbols may represent more than one bit of the data. The step 202 may comprise writing the data to a recording medium using the write symbols.

Figure 10B:
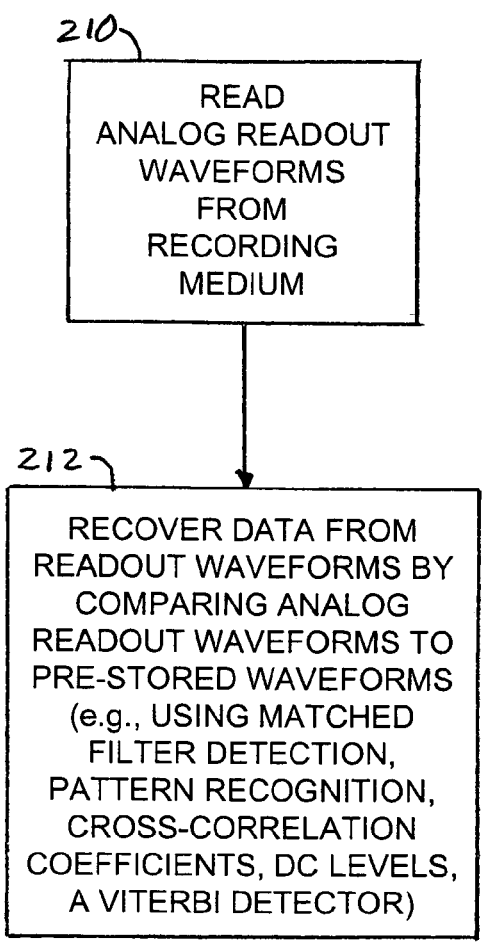

FIG. 10B is a diagram illustrating a read procedure. The read procedure may comprise a step 210 and a step 212. The step 210 may comprise reading an analog readout waveform from the recording medium. The step 212 generally comprises recovering data from the readout waveforms by comparing the analog readout waveforms to pre-stored waveforms. The comparison may include using matched filter detection, pattern recognition, cross-correlation coefficients, DC levels and/or a Viterbi detector.

Figure 11:
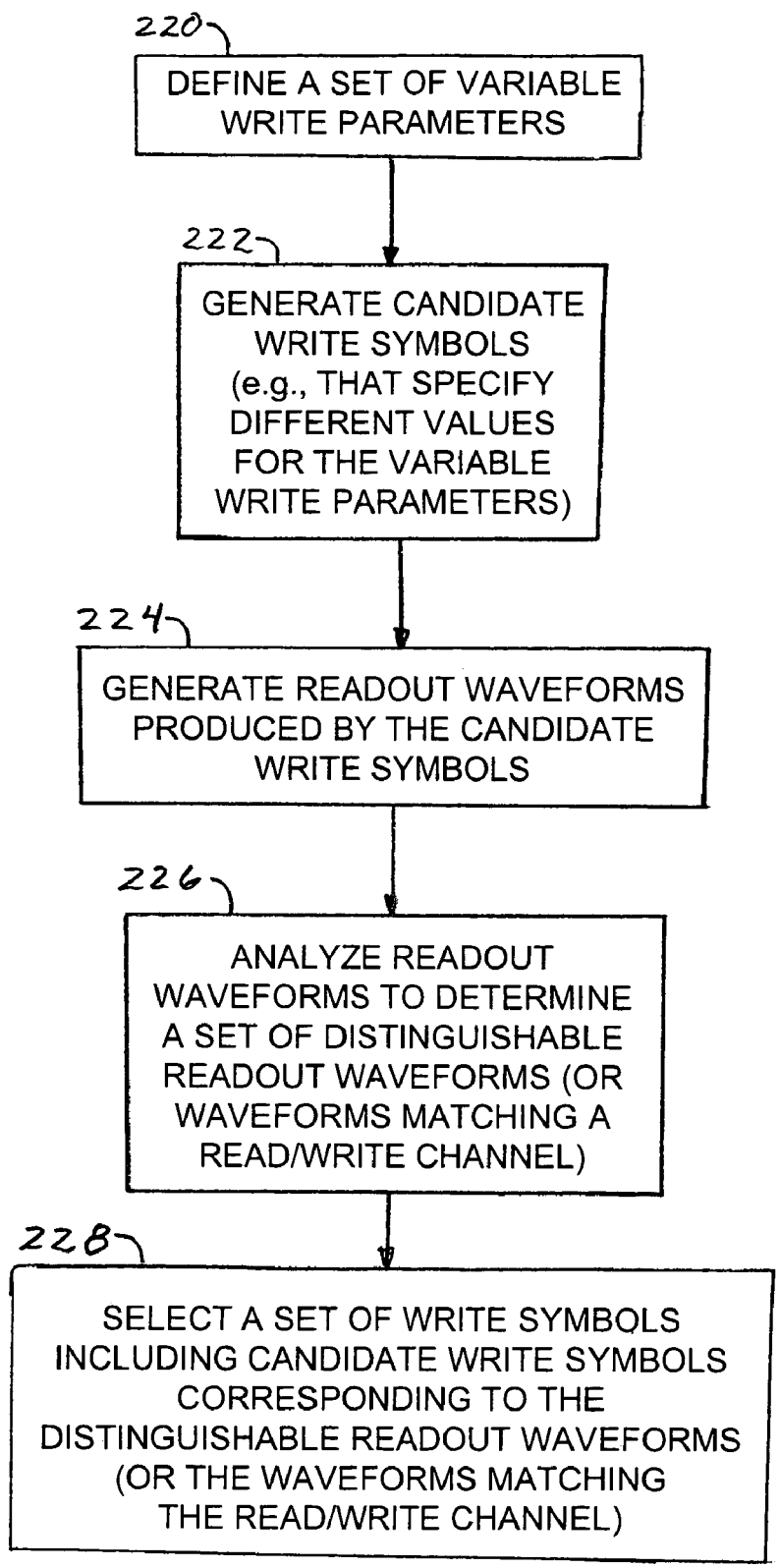
FIG. 11 is a flow diagram illustrating a procedure for defining a set of write symbols.

FIG. 11 is a diagram illustrating a procedure for defining a set of write symbols. The set of write symbols may be defined by a procedure comprising (i) defining a set of variable write parameters (e.g., the block 220), (ii) generating a plurality of candidate write symbols that specify different values of the variable write parameters (e.g., the block 222), (iii) generating a plurality of candidate readout waveforms produced by the plurality of candidate write symbols (e.g., the block 224), (iv) analyzing the readout waveforms to determine a set of distinguishable readout waveforms, or waveforms matching a readout channel (e.g., the block 226) and (v) selecting selected ones of the plurality of candidate write symbols that correspond to the distinguishable readout waveforms or the waveforms matching the read/write channel for inclusion in the set of write symbols (e.g., the block 228).

Analog optical recording has been described based on the concept of reading "analog waveforms" from an optical disc that are generated by recorded amorphous/crystalline patterns. Using a segmented analog recording method with guard bands, a variety of distinguishable readout waveforms are obtained. In an alternative method using partial response signaling, 0 and 1 waveforms are defined to match the channel and readout waveforms are formed by shifting and adding the 0 and 1 waveforms. A genetic search algorithm is used to determine write strategies that will create the desired readout waveforms.

In the description above, for the purpose of example, a phase change optical disc has been referred to as a preferred recording medium. It should be recognized that the techniques disclosed herein are particularly applicable to phase change optical discs and that the application of these techniques to optical data storage is an important advance of that art. In particular, the techniques have been applied to commercial DVD RAM discs and DVD R/W discs and discs made of materials including AgInSbTe and GeSbTe. In addition, the techniques disclosed herein may be applied to other storage media, including other optical media such as magneto-optical discs, read only discs, or write once read many discs, as well as other types of storage media such as magnetic storage media.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of recording data on a recording medium comprising:
dividing the data into N-bit segments, where N is an integer greater than 1;
mapping the data to a set of write symbols comprising $2^N$ distinct write symbols, wherein each write symbol represents a possible N-bit segment of the data and wherein the set of write symbols is defined by:
defining a set of variable write parameters;
generating a plurality of candidate write symbols that specify different values for the variable write parameters;
generating a plurality of analog readout waveforms produced by the plurality of candidate write symbols;
analyzing the analog readout waveforms to determine a set of distinguishable readout waveforms; and
selecting selected ones of the plurality of candidate write symbols that correspond to the distinguishable readout waveforms to be included in the set of write symbols; and
writing the data to the medium using the set of write symbols, wherein a cross correlation coefficient is calculated to recover the data.

2. A method of recording data on a medium as recited in claim 1 wherein the medium is an optical disc.

3. A method of recording data on a medium as recited in claim 1 wherein the medium is a phase change optical disc.

4. A method of recording data on a medium as recited in claim 1 wherein the set of variable write parameters defines characteristics of a sequence of laser pulses.

5. A method of recording data on a medium as recited in claim 1 wherein the set of variable write parameters defines the timing of a sequence of laser pulses.

6. A method of recording data on a medium as recited in claim 1 wherein writing the data to the medium includes inserting guard bands between the write symbols on a track.

7. A method of recording data on a medium as recited in claim 1 wherein writing the data to the medium includes inserting guard bands between the write symbols on a track, wherein the guard bands are appropriately sized to avoid intersymbol interference.

8. A method of recording data on a medium as recited in claim 1 wherein writing the data to the medium includes inserting guard bands between the write symbols on a track, wherein the guard bands are appropriately sized to avoid thermal crosstalk.

9. A method of recording data on a medium as recited in claim 1 further comprising using matched filter detection to recover the data.

10. A method of recording data on a medium as recited in claim 9 wherein the matched filter detection comprises comparing analog readout waveforms obtained from individual segments to waveforms in pre-stored tables using predetermined pattern recognition techniques.

11. A method of recording data on a medium as recited in claim 9 wherein the matched filter detection comprises:
sampling an analog readout waveform signal;
normalizing an amplitude of the sampled signal; and
separating the sampled signal into segments.

12. A method of recording data on a medium as recited in claim 11 wherein the matched filter detection further comprises:
calculating said cross correlation coefficient between the segments and patterns in a look-up table; and
comparing a DC level of the segments with the patterns in the look-up table.

13. A method of recording data on a medium as recited in claim 1 wherein a combination of said cross correlation coefficient and a comparison of a DC level is used to recover the data.

14. A method of recording data on a medium as recited in claim 1 wherein the variable write parameters comprise one or more of a height of a laser pulse, a duration of a laser pulse, a width of a cooling pulse following a heating pulse, an interval between adjacent laser pulses, and a power level of a laser pulse.

15. A method of recording data on a medium as recited in claim 1 wherein the analog readout waveforms are generated by recorded amorphous/crystalline patterns and read from an optical disc.

16. A method of recording data on a recording medium comprising:
dividing the data into N-bit segments, where N is an integer greater than 1;
mapping the data to a set of write symbols comprising $2^N$ distinct write symbols, wherein each write symbol represents a possible N-bit segment of the data and wherein the set of write symbols is defined by:
defining a set of variable write parameters;
generating a plurality of candidate write symbols that specify different values for the variable write parameters;
generating a plurality of readout waveforms in response to marks produced by the plurality of candidate write symbols;
analyzing the readout waveforms produced by the marks to determine a set of readout waveforms that match a read/write channel that includes the recording medium; and
selecting selected ones of the plurality of candidate write symbols that correspond to the readout waveforms that match the read/write channel that includes the recording medium to be included in the set of write symbols; and
writing the data to the medium using the set of write symbols, wherein a cross correlation coefficient is calculated to recover the data.

17. A method of recording data on a medium as recited in claim 16 wherein generating a plurality of candidate write symbols that specify different values for the variable write parameters includes using a genetic algorithm to generate the plurality of candidate write symbols.

18. A method of recording data on a medium as recited in claim 16 wherein generating a plurality of candidate write symbols that specify different values for the variable write parameters includes randomly generating the plurality of candidate write symbols.

19. A method of recording data on a medium as recited in claim 16 wherein generating a plurality of candidate write symbols that specify different values for the variable write parameters includes using expert knowledge to generate the plurality of candidate write symbols.

20. A method of recording data on a medium as recited in claim 16 wherein generating a plurality of candidate write symbols that specify different values for the variable write parameters includes using expert knowledge to generate an initial set of candidate write symbols and using a genetic algorithm to refine the initial set of candidate write symbols.

21. A method of recording data on a medium as recited in claim 16 wherein generating a plurality of candidate write symbols that specify different values for the variable write parameters includes selecting a pair of waveforms to represent individual channel bits.

22. A method of recording data on a medium as recited in claim 16 wherein generating a plurality of candidate write symbols that specify different values for the variable write parameters includes selecting a pair of waveforms to represent individual channel bits and shifting and adding combinations of the waveforms.

23. A method of recording data on a medium as recited in claim 16 wherein generating a plurality of candidate write symbols that specify different values for the variable write parameters includes selecting a pair of waveforms to represent individual channel bits wherein a spectrum of the pair of waveforms becomes band-limited and resembles a spectrum of a signal-to-noise ratio SNR(f) of the read/write channel.

24. A method of recording data on a medium as recited in claim 16 wherein analyzing the readout waveforms produced by the marks to determine a set of readout waveforms that match a read/write channel that includes the recording medium includes determining ideal readout waveforms that follow the read/write channel SNR spectrum.

25. A method of recording data on a medium as recited in claim 16 wherein the medium is an optical disc.

26. A method of recording data on a medium as recited in claim 16 wherein the medium is a phase change optical disc.

27. A method of recording data on a medium as recited in claim 16 wherein the set of variable write parameters defines characteristics of a sequence of laser pulses.

28. A method of recording data on a medium as recited in claim 16 wherein the set of variable write parameters defines the timing of a sequence of laser pulses.

29. A method of recording data on a medium as recited in claim 16 wherein a Viterbi detector is used to recover the data.

30. A method of recording data on a medium as recited in claim 16 wherein the readout waveforms comprise analog waveforms read from an optical disc and the marks comprise recorded amorphous/crystalline patterns.

* * * * *